United States Patent
Fang et al.

(10) Patent No.: US 8,278,858 B2
(45) Date of Patent: Oct. 2, 2012

(54) FLUX CANCELLATION IN A PERMANENT MAGNET GENERATOR

(75) Inventors: Si J. Fang, Carpentersville, IL (US); Richard A. Himmelmann, Beloit, WI (US); James H. Clemmons, Freeport, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 84 days.

(21) Appl. No.: 13/009,435

(22) Filed: Jan. 19, 2011

(65) Prior Publication Data

US 2012/0181892 A1 Jul. 19, 2012

(51) Int. Cl.
*H02P 27/00* (2006.01)

(52) U.S. Cl. .............. 318/400.3; 318/400.01; 318/724

(58) Field of Classification Search ............ 318/400.3, 318/400.01, 724, 720, 364, 365, 268, 801; 310/159

See application file for complete search history.

(56) References Cited

U.S. PATENT DOCUMENTS

| 4,200,374 A | * | 4/1980 | Shimizu et al. ............. 396/246 |
| 7,443,070 B2 | | 10/2008 | Dooley et al. |
| 7,777,384 B2 | | 8/2010 | Gieras et al. |

FOREIGN PATENT DOCUMENTS

DE 102007040725 A1 3/2009

OTHER PUBLICATIONS

Extended European Search Report from EP Application Serial No. 11193735.5, mailed Jun. 12, 2012, 16 pages.

\* cited by examiner

*Primary Examiner* — Karen Masih
(74) *Attorney, Agent, or Firm* — Kinney & Lange, P.A.

(57) ABSTRACT

A permanent magnet comprises a primary winding, a secondary winding, a permanent magnet, an output terminal for connection to an external load, and a switching mechanism with two modes. In a first mode of the switching mechanism, the primary winding is connected between neutral and the output terminal, and the varying magnetic flux from the permanent magnet induces a nonzero voltage at the output terminal. In the second mode, the secondary winding provides a return path to neutral for the primary winding, thereby providing negligible voltage and current at the output terminal and substantially canceling change in magnetic flux from the permanent magnet.

16 Claims, 3 Drawing Sheets

US 8,278,858 B2

FLUX CANCELLATION IN A PERMANENT MAGNET GENERATOR

BACKGROUND

The present invention relates generally to permanent magnet generators, and more particularly to methods and apparatus for de-energizing permanent magnet generators.

Electromagnetic generators convert mechanical energy into electricity by producing changing magnetic flux from mechanical movement. Changes in magnetic flux through windings of wire induce voltage in these windings according to Faraday's law, producing deliverable electric energy. Permanent magnet generators (PMGs) produce varying flux through generator windings either with permanent magnet rotors, or with permanent magnet stators. Generators with permanent magnet rotors drive rotating permanent magnets to produce magnetic fields that vary at fixed stator winding locations. Generators with permanent magnet stators use stationary magnets to produce magnetic fields through which rotor windings travel, for the same ultimate effect. For simplicity, PMGs will hereafter be assumed to use permanent magnet rotors, although those skilled in the art will understand that generators can analogously be constructed with stationary magnets and rotating windings.

In some situations it becomes necessary to rapidly de-energize a generator, either for operator safety or to prevent damage to generator components. Operating an energized generator while shorts are present between generator windings, for instance, can cause rapid resistive burnout of generator wiring. When such harmful faults are detected, it is often desirable for generators to quickly and automatically de-energize to avoid further damage. It may also be necessary to de-energize a generator to avoid dangerous high voltages. Generators which produce flux with field windings rather than permanent magnets can rapidly de-energize by cutting off currents to field windings. PMGs, although desirable for many reasons, are more difficult to rapidly de-energize. So long as permanent magnet rotors continue to rotate, they ordinarily induce currents in stator windings. Rotating magnets produce varying magnetic flux governed by the right-hand-rule. Whenever net flux passing through stator windings varies, this induces currents tending to oppose the change in flux. As a result, a PMG will ordinarily continue to produce voltage as long as the permanent magnet rotor turns.

A variety of techniques have been developed to de-energize PMGs. A PMG can be de-energized by mechanically halting rotor movement, but this method is slow, and usually necessitates decoupling the generator drive shaft from its mechanical power source. As a faster alternative, some systems include specialized stator windings attached to an external power supply. When rapid flux cancellation is needed, these systems force current through the specialized stator windings to produce a countervailing magnetic flux, canceling changes in flux generated by the rotating permanent magnets. Another system (U.S. Pat. No. 7,777,384) provides conductive shunts which route flux away from stator windings, thereby preventing currents from being induced on stator windings. During normal operation, these shunts are saturated, and flux passes through the stator windings as usual. In a fault condition, the shunts can be "opened" by halting saturation, to de-energize the stator windings. A third system (U.S. Pat. No. 7,443,070) similarly uses shunts to route flux away from stator windings, but disconnects these shunts mechanically during normal generator operation.

PMGs are preferably capable of rapidly de-energizing without sacrificing normal operational power. As described above, existing mechanisms for de-energizing PMGs add considerable bulk or complexity. Simpler, smaller mechanisms are highly desirable.

SUMMARY

The present invention is directed toward permanent magnet generators having a primary winding, a secondary winding, a permanent magnet, an output terminal for connection to an external load, and a switching mechanism with two modes. In a first mode of the switching mechanism, the primary winding is connected between neutral and the output terminal, and the varying magnetic flux from the permanent magnet induces a nonzero current and voltage at the output terminal. In the second mode, the secondary winding provides a return path to neutral for the primary winding, thereby providing negligible voltage or current at the output terminal and substantially canceling change in magnetic flux from the permanent magnet.

DETAILED DESCRIPTION

Figure 1:
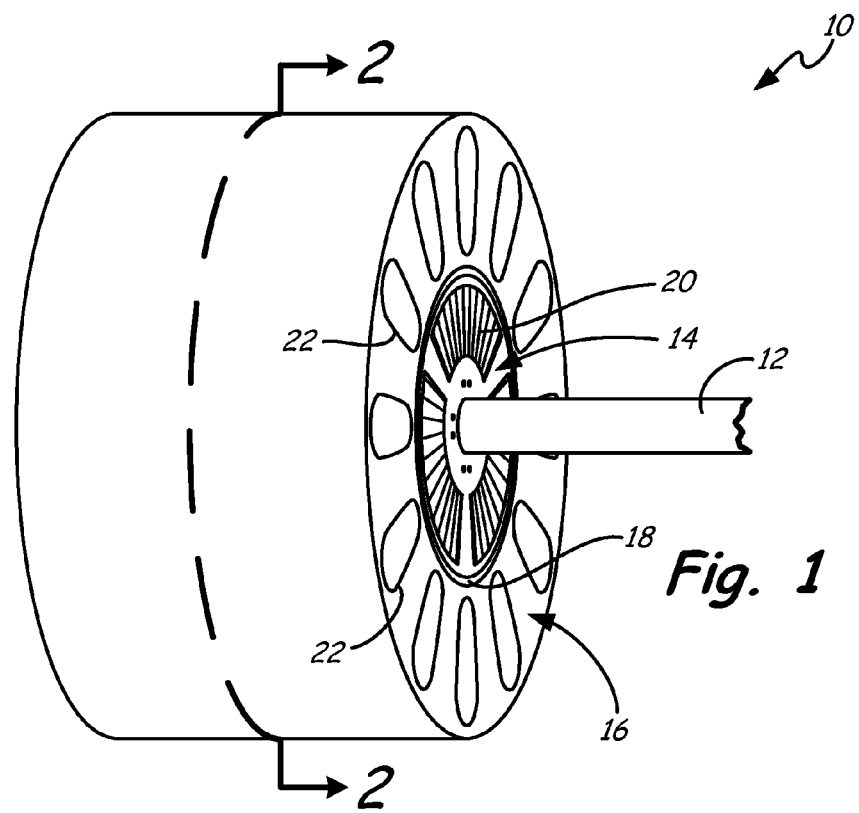
FIG. 1 is a perspective view of a section of a permanent magnet generator.

FIG. 1 is a perspective view of permanent magnet generator 10, including drive shaft 12, rotor 14 (with permanent magnets 20), stator 16 (with stator coil 22), and air gap 18. Drive shaft 12 is rotatable by an energy source (not shown) such as rotational motion of a vehicle drive system, wind, water, or another prime mover. Drive shaft 12 turns rotor 14, which contains cylindrically arranged permanent magnets 20. Stator 16, which surrounds rotor 14, contains multiple stator coils 22, each with multiple windings. Stator coils 22 are dense coils of looping conductive wire. Rotor 14 is separated from stator 16 by air gap 18, a narrow open space. It will be understood by one skilled in the art that, although this description focuses on generators having permanent magnet rotors, the invention could analogously be constructed with a permanent magnet stator and multiple rotor coils.

Figure 2:
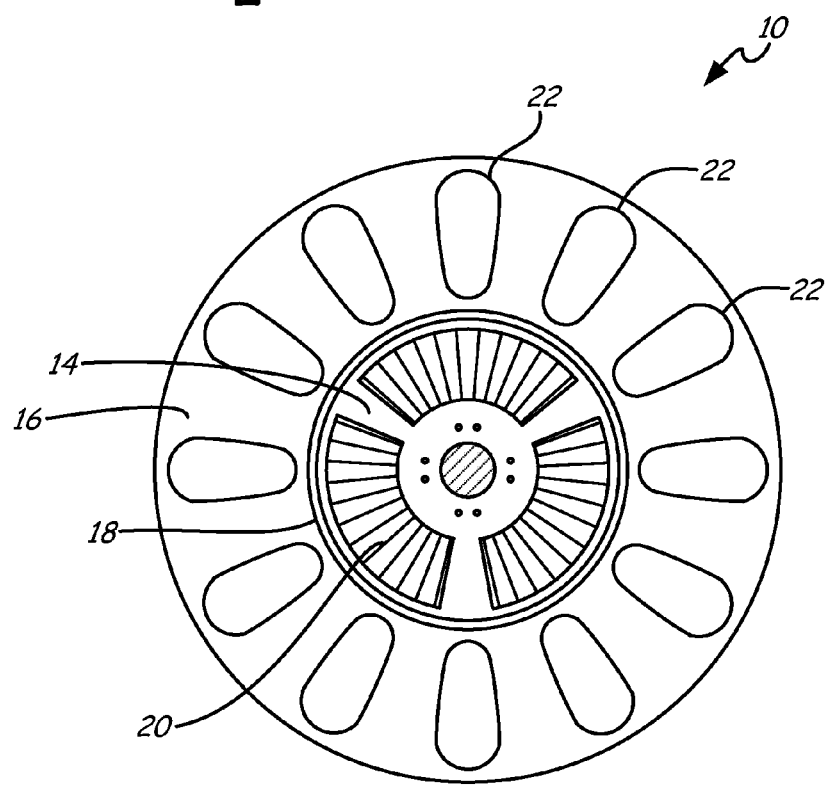
FIG. 2 is a cross-sectional view of the permanent magnet generator of FIG. 1, illustrating a permanent magnet rotor and a stator with stator windings.

FIG. 2 is a cross-section of permanent magnet generator 10 along cross-section line 2-2 from FIG. 1. FIG. 2 depicts generator 10, including drive shaft 12, rotor 14 (with permanent magnets 20), stator 16 (with stator coils 22), and air gap 18. Permanent magnets 20 are anchored to rotor 14, and stator coils 22 are anchored to stator 16. Magnetic fields from permanent magnet 20 cross air gap 18 and pass through stator coils 22 with magnetic flux $\Phi_{pm}$ (not shown in FIG. 2; see FIG. 3). As drive shaft 12 rotates rotor 14, the movement of permanent magnets 20 causes $\Phi_{pm}$ to vary, causing a voltage to develop across stator coils 22. The change in $\Phi_{pm}$ produces an electromotive force $\epsilon$ in volts described by Faraday's law:

$$\varepsilon = N\left|\frac{d\Phi_{pm}}{dt}\right| \quad [1]$$

(where $N$ is the number of turns in stator winding 22)

Electromotive force $\varepsilon$ induces a current $I_{stator}$ in stator coils 22, which can be coupled to an external load to supply power.

Figure 3A:
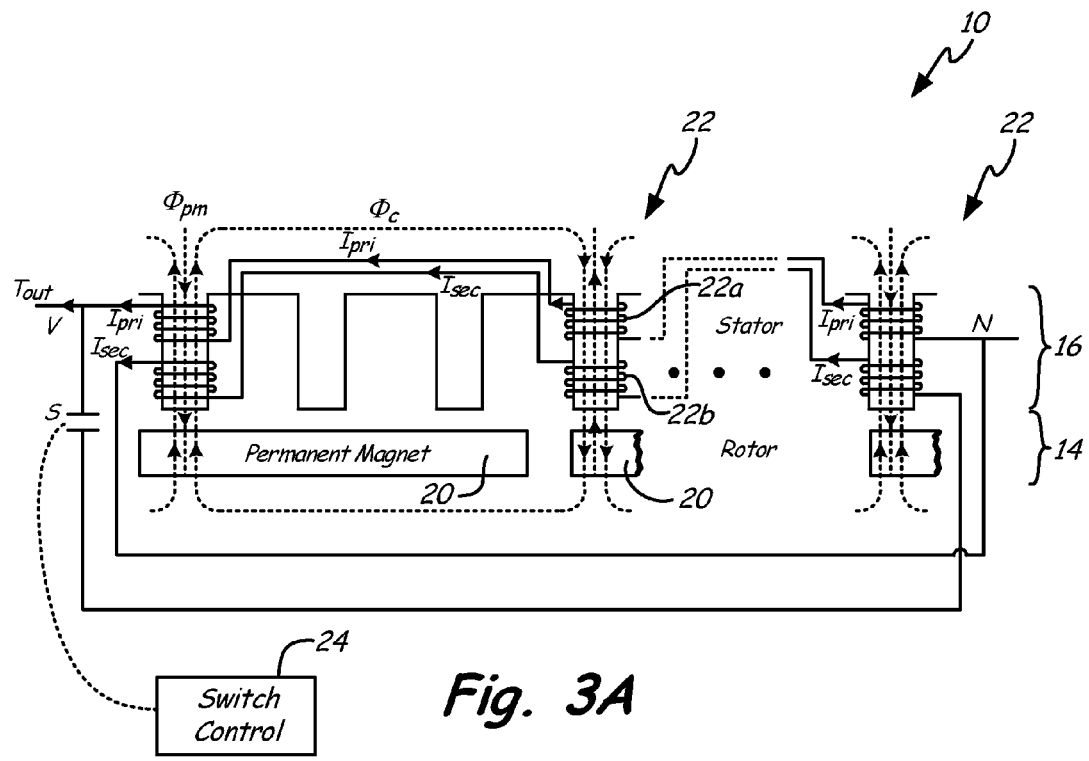
FIG. 3A is a schematic view of one phase of the rotor and stator of FIG. 1.

FIG. 3A is a schematic view of permanent magnet generator 10 illustrating a stator coil configuration of the present invention. FIG. 3A illustrates rotor 14 (with permanent magnet 20), stator 16 (with stator coils 22), magnetic flux $\Phi_{pm}$, magnetic flux $\Phi_c$, switching contact S, switch control 24, neutral N, and output terminal $T_{out}$ with output voltage V. Stator coils 22 comprise primary windings 22a (with current $I_{pri}$) and secondary windings 22b (with current $I_{sec}$).

Figure 3B:
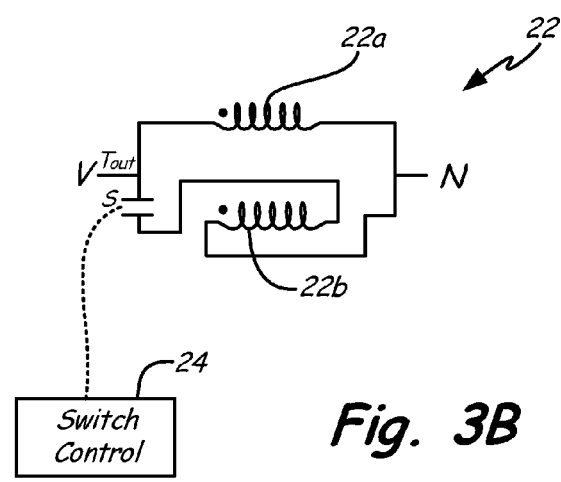
FIG. 3B is a simplified schematic view of the stator configuration of FIG. 3A.

Every set of primary windings 22a in stator coil 22 is uniquely paired with a set of secondary windings 22b. Primary windings 22a and secondary windings 22b have an identical number of turns. Primary windings 22a extend from neutral post N to output terminal $T_{out}$, while secondary windings 22b and switching contactor S form a cancellation circuit between neutral post N and output terminal $T_{out}$. As shown in FIGS. 3A and 3B, secondary windings 22b extend from switching contactor S to neutral post N. Alternatively, switching contactor S could be located between secondary windings 22b and neutral post N, and secondary windings 22b could extend between output terminal $T_{out}$ and switching contactor S.

As rotor 14 turns, the movement of permanent magnet 20 produces magnetic flux $\Phi_{pm}$ through primary windings 22a and secondary windings 22b, as described above. The induced current through primary windings 22a is $I_{pri}$, and the induced current through secondary windings 22b is $I_{sec}$. $I_{pri}$ and $I_{sec}$ together make up $I_{stator}$ ($I_{stator}=I_{pri}+I_{sec}$). During normal operation of the circuit configuration of FIGS. 3A and 3B, $I_{sec}=0$, and $I_{stator}=I_{pri}$.

The opening and closing of switching contactor S is controlled by switch control 24. Switching contactor S is open during normal generator operation, and disconnects secondary windings 22b so that $I_{sec}$ is zero. In this state, current $I_{pri}$ is supplied to output terminal $T_{out}$. V, the voltage at output terminal $T_{out}$, is nonzero value so long as rotor 14 continues to turn. Current $I_{pri}$ tends to oppose change in flux $\Phi_{pm}$, according to Lenz's law (as does $I_{sec}$, when present), producing a countervailing flux $\Phi_c$. Because of load current limiting, change in $\Phi_c$ will always be less than change in $\Phi_{pm}$, and will never fully cancel change in $\Phi_{pm}$. Higher load resistances produce lower currents (V=IR), and therefore lower induced flux. Lower resistances produce higher currents which induce greater flux. In the limit of a perfect short circuit condition (i.e. zero load resistance), change in $\Phi_c$ will cancel change in $\Phi_{pm}$. The relationship between output voltage V, magnetic flux $\Phi_{pm}$ (produced by permanent magnet generator 20) and magnetic flux $\Phi_c$ (produced by the currents $I_{pri}$ and $I_{sec}$) is described by:

$$V = N\left(\frac{d\Phi_{pm}}{dt}\right) - N\left(\frac{d\Phi_c}{dt}\right) \quad [2]$$

When switching contactor S is closed, PMG 10 enters a cancellation mode in which it rapidly de-energizes. Closing switching contactor S shorts primary windings 22a through secondary windings 22b, effectively bypassing output terminal $T_{out}$. Because internal resistances in secondary windings 22b are much lower than the generator load at output terminal $T_{out}$, substantially all of primary current $I_{pri}$ will flow in series from primary windings 22a to secondary windings 22b, such that $I_{pri}=I_{sec}$. Because the internal resistance of secondary winding 22b is very small, voltage V at output terminal Tout will be approximately zero, and the rate of change of $\Phi_c$ will approach the rate of change of $\Phi_{pm}$, as indicated by equation [2]. Thus, closing switching contactor S allows change in $\Phi_c$ to approximately cancel change in $\Phi_{pm}$, thereby substantially de-energizing PMG 10 (see equation [1], above).

While switching contactor S is closed, primary windings 22a runs in series with secondary windings 22b. Thus, shorting primary winding 22a through secondary winding 22b effectively provides twice as many winding turns for the production of $\Phi_c$ as if primary windings 22a were shorted directly. According to Ampere's law, $\Phi \propto N I$. By doubling the effective number of turns in stator coil 22, the current needed to produce $\Phi_c$ is halved. This reduction in current protects stator coils 22 against resistive burnout.

FIG. 3B is a simplified schematic view of stator coil 22 of FIG. 3A, showing only one phase of primary windings 22a, secondary windings 22b, neutral post N, output terminal $T_{out}$, switching contact S, and switch control 24. Switching contact S is an electrical switch capable of connecting or isolating secondary windings 22b, and is open during normal operation of PMG 10. Switch control 24 actuates switching contact S. In one embodiment, switch control 24 opens and closes switching contact S in response to operator input. In another embodiment, switch control 24 may open and close switching contact S automatically in response to sensed PMG conditions. Switch control may automatically close switching contact S in response, for instance, to detection of a harmful generator fault, thereby immediately de-energizing PMG 10 to avoid damage. During normal operation of PMG 10, switching contactor S is open, primary windings 22a generate power, and secondary windings 22b are electrically isolated. In a cancellation mode of PMG 10, switching contactor S is closed, and primary windings 22a are shorted through secondary windings 22b, as previously discussed with respect to FIG. 3A.

Figure 4A:
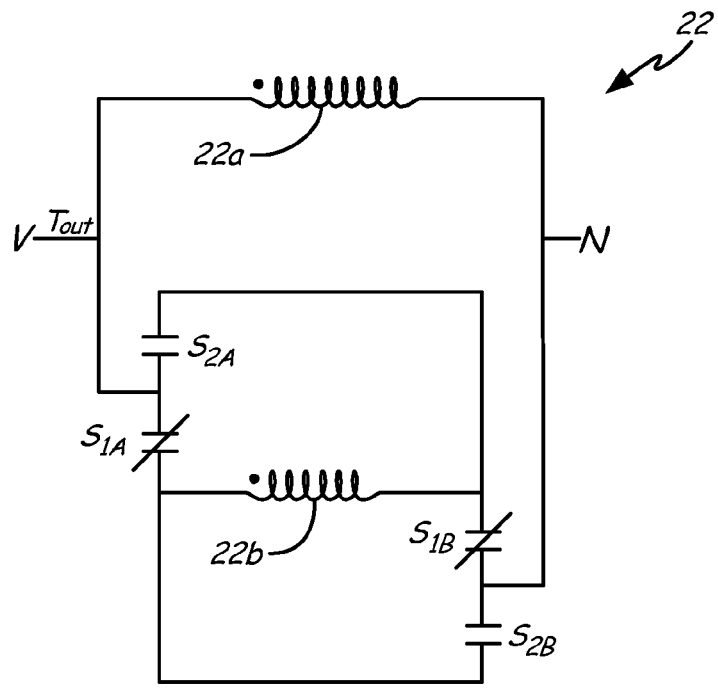
FIG. 4A is a simplified schematic view of an alternative stator configuration.
Figure 4B:
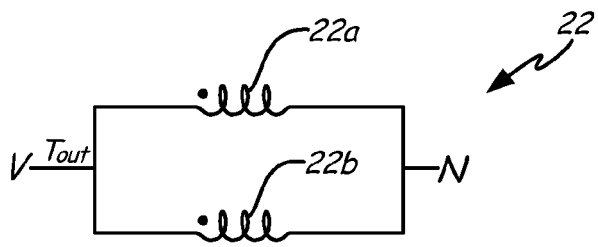
FIG. 4B is a simplified schematic view of the normal operation mode of the stator configuration of FIG. 4A.
Figure 4C:
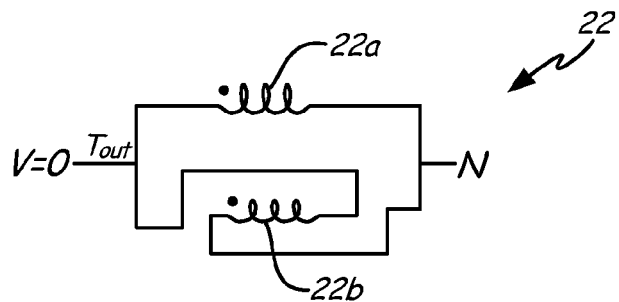
FIG. 4C is a simplified schematic view of the cancellation mode of the stator configuration of FIG. 4A.

FIG. 4A is a simplified schematic view of an alternative circuit configuration for stator coil 22. FIG. 4A illustrates primary windings 22a, secondary windings 22b, neutral post N, output terminal $T_{out}$, voltage V, and switching contactors $S_{1A}$, $S_{1B}$, $S_{2A}$, and $S_{2B}$. FIGS. 4B and 4C are simplified schematic views of states of the circuit configuration of FIG. 4A, illustrating primary windings 22a, secondary windings 22b, neutral post N, output terminal $T_{out}$, and voltage V. FIG. 4B illustrates a normal operation mode, while FIG. 4C illustrates a cancellation mode. Switching contactors $S_{1A}$, $S_{1B}$, $S_{2A}$, and $S_{2B}$ are contactors like switching contactor S.

During normal operation, the circuit configuration of FIGS. 3A and 3B only utilizes primary windings 22a to generate power, leaving secondary winding 22b disconnected. The alternative configuration illustrated in FIG. 4A enables the entirety of stator coil 22—both primary windings 22a and secondary windings 22b—to be utilized for power generation, but requires slightly more sophisticated wiring.

During ordinary operation, switching contactors $S_{1A}$ and $S_{1B}$ are closed, and switching contactors $S_{2A}$ and $S_{2B}$ are open, such that primary windings 22a and secondary windings 22b operate in parallel, as indicated by FIG. 4B. This configuration doubles the utilized copper area of the winding, and therefore reduces copper power loss relative to the configuration of FIGS. 3A and 3B. In the cancellation mode illustrated by FIG. 4C, switches are reversed: switching contactors $S_{2A}$ and $S_{2B}$ are closed, and switching contactors $S_{1A}$ and $S_{1B}$ are open. In this mode, primary windings 22a are shorted through secondary windings 22b, as discussed previously. This configuration produces zero voltage V at output terminal $T_{out}$, and cancels change in flux through stator coil 22 by approximately matching change in $\Phi_c$ to change in $\Phi_{pm}$. As discussed with respect to FIG. 3A, neither flux cancellation nor voltage cancellation will be absolute. Because secondary windings 22b (like primary windings 22a) possess some slight internal resistance, a very small fraction of current $I_{pri}$ will exit output terminal $T_{out}$, rather than flowing through secondary windings 22b as $I_{sec}$. As a result, a small voltage V (negligible, for most purposes) will be present at $T_{out}$ even while stator coils 22 are in the cancellation mode (FIG. 4B). Similarly, change in $\Phi_c$ will never entirely cancel change in $\Phi_{pm}$, but will sufficiently cancel change in $\Phi_{pm}$ to substantially de-energize stator coils 22.

The present invention offers a mechanism for substantially canceling flux through stator coil 22 without halting permanent magnet rotor 14, and with little additional manufacturing complexity. No external power source is required for flux cancellation, and the additional wiring needed for cancellation is minimal. The only moving parts used by this cancellation system are switching contactors, which are simple, small, and well-known in the art. As disclosed in the embodiment of FIGS. 4A through 4C, all windings of stator coils 22 are used during normal operation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A permanent magnet generator comprising:
   at least one permanent magnet;
   an output terminal for connection to an electrical load;
   a primary winding through which the at least one permanent magnet produces varying magnetic flux, the primary winding connected between neutral and the output terminal; and
   a cancellation circuit connected between the output terminal and neutral, the cancellation circuit including a secondary winding through which the at least one permanent magnet produces varying magnetic flux, and a switching mechanism having:
      a first switch state wherein the cancellation circuit provides no current path for the primary winding, and wherein variation in magnetic flux through the primary winding induces a current through the primary winding, producing nonzero voltage at the output terminal; and
      a second switch state wherein the secondary winding provides a return path to neutral for the primary winding, thereby providing negligible voltage or current at the output terminal and substantially canceling change in flux through the primary and secondary windings.

2. The permanent magnet generator of claim 1, wherein the switching mechanism is controlled manually by an operator.

3. The permanent magnet generator of claim 1, wherein the switching mechanism automatically switches from the first switch state to the second switch state in response to a fault condition.

4. The permanent magnet generator of claim 1, wherein no current flows through the secondary winding in the first switch state.

5. The permanent magnet generator of claim 1, wherein:
   the first switch state connects the secondary winding to the output terminal and neutral, in parallel with the primary winding; and
   variation in magnetic flux through the secondary winding induces a current in the secondary winding, producing nonzero voltage at the output terminal.

6. The permanent magnet generator of claim 1, wherein the primary and secondary windings have an identical number of turns.

7. The permanent magnet generator of claim 1, further comprising a stator and a rotor, wherein the primary and secondary windings are located on the stator and the at least one permanent magnet is located on the rotor.

8. A permanent magnet generator comprising:
   an output terminal for connection to an electrical load;
   a permanent magnet rotor which produces a magnetic flux;
   a primary stator winding in which change in the magnetic flux can induce a first current opposing the change in the magnetic flux;
   a secondary stator winding in which change in the magnetic flux can induce a second current opposing the change in the magnetic flux; and
   a switching mechanism having:
      a first switch state wherein the primary stator winding supplies current and voltage at the output terminal; and
      a second switch state wherein the primary stator winding is electrically connected to the secondary stator winding to provide a return path to neutral for the primary stator winding, thereby equalizing the first and second currents, which together produce magnetic flux that substantially cancels change in the magnetic flux.

9. The permanent magnet generator of claim 8, wherein the switching mechanism switches states in response to operator commands.

10. The permanent magnet generator of claim 8, wherein the switching mechanism switches states automatically upon detection of a generator fault.

11. The permanent magnet generator of claim 8, wherein the secondary stator winding also provides current and voltage to the output terminal, in the first switch state.

12. The permanent magnet generator of claim 8, wherein the secondary stator winding is isolated in the first switch state and the second current is correspondingly zero in the first switch state, regardless of movement of the permanent magnet rotor.

13. The permanent magnet generator of claim 8, wherein the primary and secondary stator windings have an identical number of turns.

14. A permanent magnet generator comprising:
   an output terminal for connection to an external load
   a primary winding connected between neutral and the output terminal;
   at least one permanent magnet capable of producing a varying magnetic flux through the primary winding, thereby inducing an first current in the primary winding opposed to the change in flux; and
   a secondary winding selectably electrically connectable with the primary winding to provide a return path to neutral for the primary winding so that no voltage or current is provided to the external load when the secondary winding is connected with the primary winding.

15. The permanent magnet generator of claim 14, wherein the primary winding and the secondary winding have an identical number of turns.

16. The permanent magnet generator of claim 14, wherein shorting the primary generator winding causes current induced by the permanent magnet in the primary and secondary windings to substantially completely cancel changes in the varying magnetic flux.

* * * * *